US012716505B1

(12) United States Patent
Mjelde

(10) Patent No.: US 12,716,505 B1
(45) Date of Patent: Aug. 25, 2026

(54) ADJUSTABLE FLOW-SYNCHRONIZATION RETURN VALVE FOR HYDRAULIC PRESSURE BALANCING

(71) Applicant: AquaStar Pool Products, Inc., Ventura, CA (US)

(72) Inventor: Olaf Mjelde, Ventura, CA (US)

(73) Assignee: AQUASTAR POOL PRODUCTS, INC., Ventura, CA (US)

( * ) Notice: Subject to any disclaimer, the term of this patent is extended or adjusted under 35 U.S.C. 154(b) by 0 days.

(21) Appl. No.: 19/196,055

(22) Filed: May 1, 2025

Related U.S. Application Data

(63) Continuation-in-part of application No. 18/799,807, filed on Aug. 9, 2024, now Pat. No. 12,392,414.

(51) Int. Cl.
*F16K 1/04* (2006.01)
*F16K 1/42* (2006.01)
*F16L 55/055* (2006.01)

(52) U.S. Cl.
CPC . *F16K 1/04* (2013.01); *F16K 1/42* (2013.01)

(58) Field of Classification Search
CPC ..... F16K 1/02; F16K 1/04; F16K 1/42; F16K 1/52; F16K 25/00; F16L 55/027; F16L 55/02772
USPC .............................. 138/40–46; 251/264, 266
See application file for complete search history.

(56) References Cited

U.S. PATENT DOCUMENTS 2,532,019 A * 11/1950 Goldberg ............. G05D 7/0186 62/511
2,568,123 A * 9/1951 Goldberg ................ F25B 41/30 138/42
3,139,114 A * 6/1964 Benzel .................. F16L 55/027 138/45
3,276,479 A * 10/1966 Windsor ................. F16K 17/34 138/43
3,739,983 A * 6/1973 Jousson ............... A61H 13/005 138/40

(Continued)

FOREIGN PATENT DOCUMENTS

GB 2537611 A * 10/2016 ........... F24D 19/088

*Primary Examiner* — Marina A Tietjen
(74) *Attorney, Agent, or Firm* — Cisto & Thomas LLP

(57) ABSTRACT

A flow-synchronization return (FSR) valve is disclosed herein. The FSR valve includes a base comprising a threaded ring; a valve element consisting of a bolt with a threaded shaft configured to engage the threaded ring, a smooth shank portion, and a bolt head comprising a first surface; a body including a second surface; and at least one restriction gap stop. The flow rate of a fluid through the FSR valve is based, in part, on the separation distance between the first surface and the second surface. And the direction of the fluid flowing through the FSR valve is based, in part, on the shape and orientation of the restriction gap stops. Among other things, the restriction gap stops are configured to prevent the first surface from contacting the second surface. The restriction gap stops may be integral to and protrude from the first surface, or from the second surface, both of which may be characterized by a matching conical shape. The threaded shaft/portion is configured to engage the threaded ring when the first surface and the second surface are not in contact, and the threaded shaft/portion is configured to disengage the threaded ring when the first surface and the second surface are in contact.

30 Claims, 3 Drawing Sheets

(56) References Cited

U.S. PATENT DOCUMENTS

| | | | | | |
|---|---|---|---|---|---|
| 4,200,119 | A | * | 4/1980 | Cunningham ...... | A61M 39/225<br>138/40 |
| 4,300,246 | A | | 11/1981 | Gould | |
| 4,431,030 | A | * | 2/1984 | Nachazel ............ | H01H 43/285<br>92/143 |
| 4,433,863 | A | | 2/1984 | Mathews | |
| 4,896,384 | A | | 1/1990 | Dijkhuizen | |
| 4,939,797 | A | | 7/1990 | Goettl | |
| 5,926,865 | A | | 7/1999 | Witinski | |
| 8,869,319 | B2 | | 10/2014 | Griffin | |
| 8,950,690 | B2 | | 2/2015 | Kraft | |

* cited by examiner 154
150
152
158
160
130
170

156
140
172
100
132
131
130
140
116
138
119
112
122
134
180
126
134
140
180
120
112
119
134
116

132
131
138
124

ADJUSTABLE FLOW-SYNCHRONIZATION RETURN VALVE FOR HYDRAULIC PRESSURE BALANCING

CROSS-REFERENCE TO RELATED APPLICATION(S)

This application is a continuation-in-part of U.S. patent application Ser. No. 18/799,807, titled "Adjustable flow-synchronization return valve for hydraulic pressure balancing," filed Aug. 9, 2024, the contents of which are incorporated by reference herein in their entirety.

TECHNICAL FIELD

The invention generally relates to an adjustable valve for a pool. In particular, the invention relates to an adjustable flow return valve for balancing the hydraulic pressure across multiple return lines to a pool or like system.

BACKGROUND

Pools generally use a pump system to pull water from a pool, filter the water, and return the water to the pool. The water returned to the pool is typically discharged at several locations in the pool, which helps to circulate water throughout the pool. Maintaining proper water circulation across the entire pool is important for multiple reasons: (a) it increases the chance of debris getting picked up at the inlet(s) to the filter system, (b) increases the distribution of chlorine or other chemical throughout the pool, and (c) inhibits the growth of algae and bacteria.

Depending on the layout of the pool equipment, however, a relatively large portion of the water is returned to the pool through the outlet closest to the pump, and a relatively small amount of water returned through the outlet farthest from the pump. This is due to friction, which reduces the water pressure as a function of the length of the discharge line. As a result, the water in the pool is circulated vigorously for the closer outlets and poorly for the more remote outlet.

There is therefore a need for a technique to balance the hydraulic pressure across all the outlets in order to balance the flow of water through all the outlets.

SUMMARY

The invention in the preferred embodiment features a novel return valve for synchronizing the flow with other return flow valves. In the first preferred embodiment, the flow-synchronization return (FSR) valve comprises: a base including a threaded ring; a valve element including a threaded shaft or portion, a smooth shank portion, and a first surface; and a valve body including a second surface and at least one restriction gap stop protruding from the second surface. The flow rate of a fluid through the FSR valve is based, in part, on the separation distance between the first surface and the second surface. While this distance is adjustable, the restriction gap stop is configured to prevent the first surface from contacting the second surface. By preventing the first surface from contacting the second surface, the return valve ensures that at least a small amount of fluid can pass through the valve at all times, thus preventing the valve from creating back pressure that could damage the pool pump equipment. Moreover, the threaded shaft/portion is configured to engage the threaded ring when the first surface and the second surface are not in contact with one another, and the threaded shaft/portion is configured to disengage the threaded ring when the first surface and the second surface are in contact with one another, thereby preventing excessive torque on the valve element from damaging the threads of the base or valve element.

In the first preferred embodiment, each of the restriction gap stops is characterized by an elongated ridge that projects from the second surface. In other embodiments, the restriction gap stops are elongated ridges that project from the first surface.

Each elongated ridge is configured to direct water through the FSR valve and out of the valve in a direction perpendicular to the valve body. This maximizes the force of the water out of the valve which maximizes the circulation of the pool water. In some embodiments, the first and second surfaces are characterized by a conical shape that directs fluid out of the valve. The FSR valve may further include a housing which is mounted to the wall of the pool. The body of the FSR valve is configured to swivel within this housing to direct the fluid out of the valve in a desired direction.

In the preferred embodiment, the valve element consists of a bolt with a head, where the head of the bolt includes the first surface. The bolt head may be configured to be turned by an Allen wrench, screw driver, or like tool. The bolt is centered within the valve body and accessed through the outlet of the valve. The bolt includes a threaded shaft comprising a plurality of threads characterized by a fine pitch. Fine threads inhibit the bolt from turning inadvertently due to the vibration of the fluid passing through the valve.

In a second preferred embodiment, the FSR valve consists of: a base comprising an inner threaded ring; a valve element consisting of a bolt including a threaded shaft or portion configured to engage the threaded ring, a smooth shank portion, and a bolt head comprising a first surface; a body including a second surface; and at least one restriction gap stop. The flow rate of a fluid through the FSR valve is based, in part, on the separation distance between the first surface and the second surface, which can be adjusted by turning the bolt. And the direction of the fluid flowing through the FSR valve is based, in part, on the shape and orientation of the restriction gap stops. Among other things, the restriction gap stops are configured to prevent the first surface from contacting the second surface. The restriction gap stops may be integral to and protrude from the first surface or second surface, both of which may be characterized by a matching conical shape. The threaded shaft/portion is configured to engage the threaded ring when the first surface and the second surface are not in contact with one another, and the threaded shaft/portion is configured to disengage the threaded ring when the first surface and the second surface are in contact with one another.

In the second preferred embodiment, the base further includes an outer ring configured to mount to the body, and a plurality of spokes connecting the inner threaded ring to the outer ring. A plurality of apertures are thus formed between the inner threaded ring and outer ring. These apertures are configured to pass water or other fluid to the valve body where the fluid is directed in a high-velocity stream into the pool.

In some embodiments, the invention further includes a method of synchronizing the flow of fluid through a plurality of flow-synchronization return (FSR) valves. The method comprises: opening each of the plurality of FSR valves to its fully open setting; identifying a first FSR valve with a maximum flow rate; rotating a valve element of a first FSR valve a flow until a desired flow rate through the first FSR valve is achieved; and rotating a valve element of the remining FSR valve until the flow rate through each FSR valve matches the flow rate through the first FSR valve.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Figure 1:
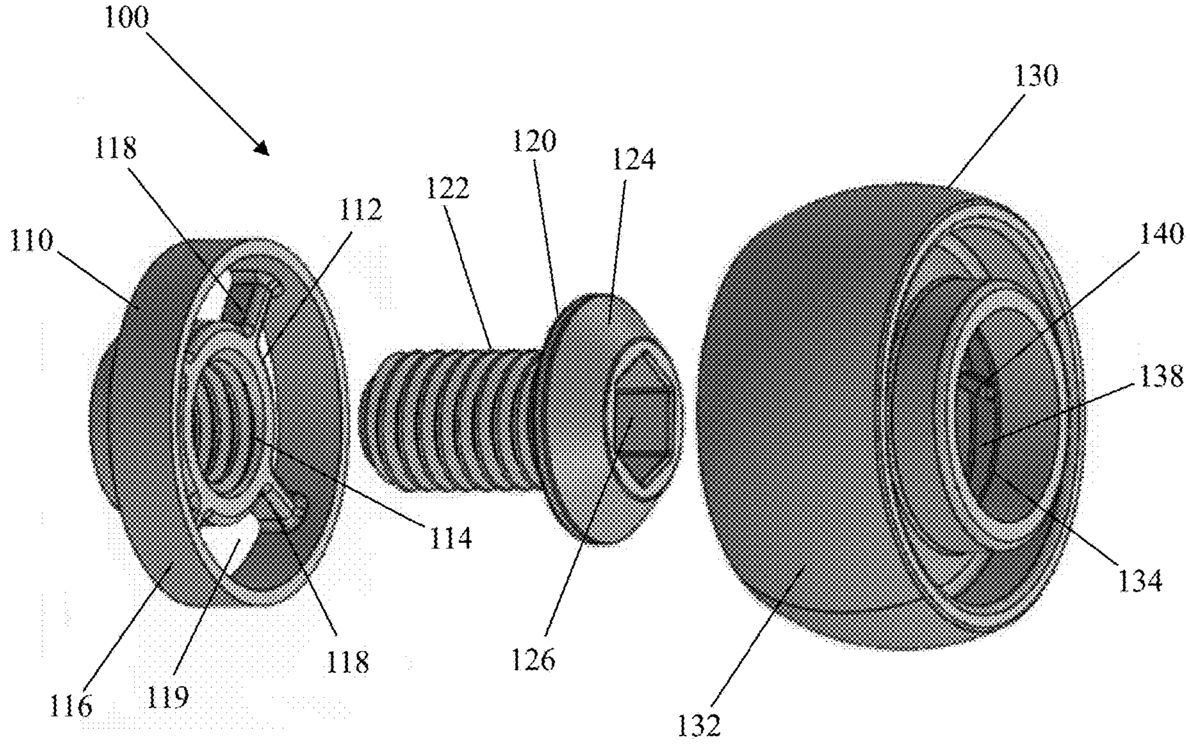
FIG. 1 is an exploded view of a flow-synchronization return valve, in accordance with the first preferred embodiment.
Figure 2:
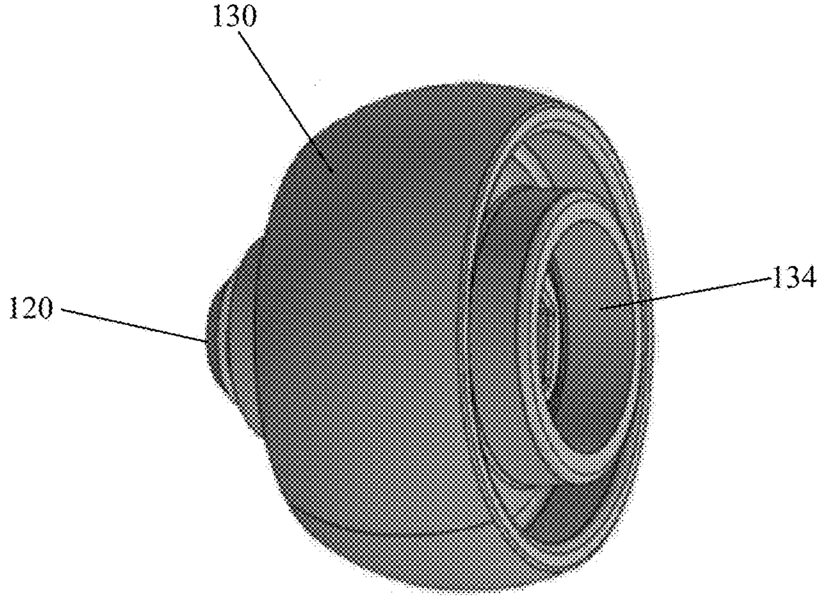
FIG. 2 is a perspective view of the flow-synchronization return valve, in accordance with the first preferred embodiment.
Figure 3:
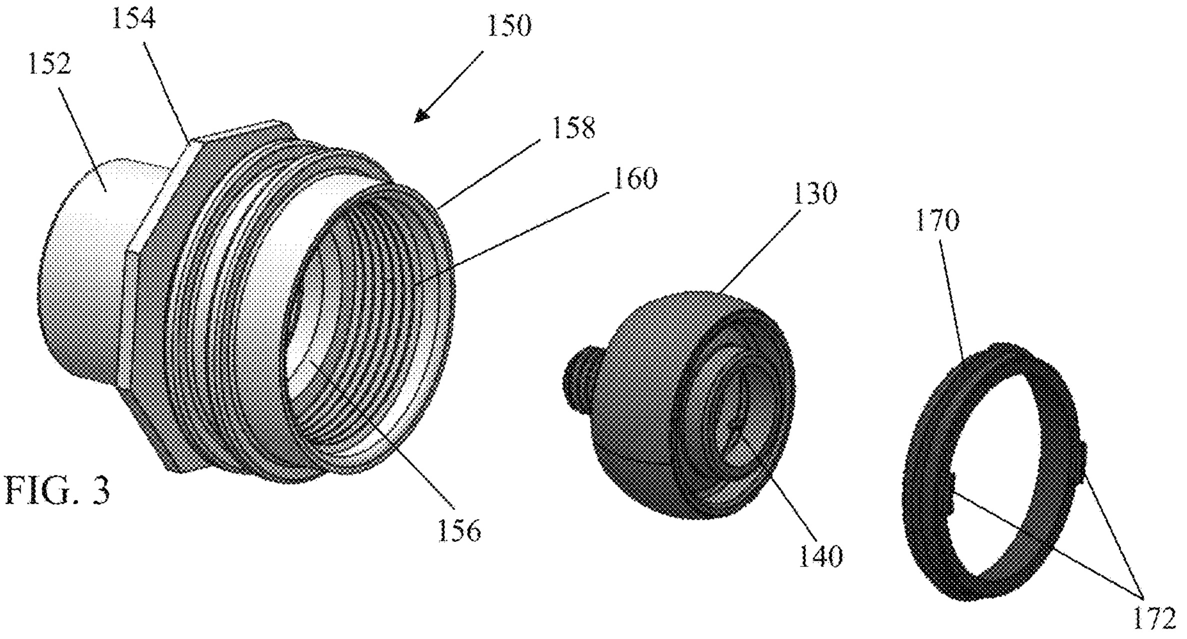
FIG. 3 is an exploded view of the flow-synchronization return valve with housing, in accordance with the first preferred embodiment.
Figure 4:
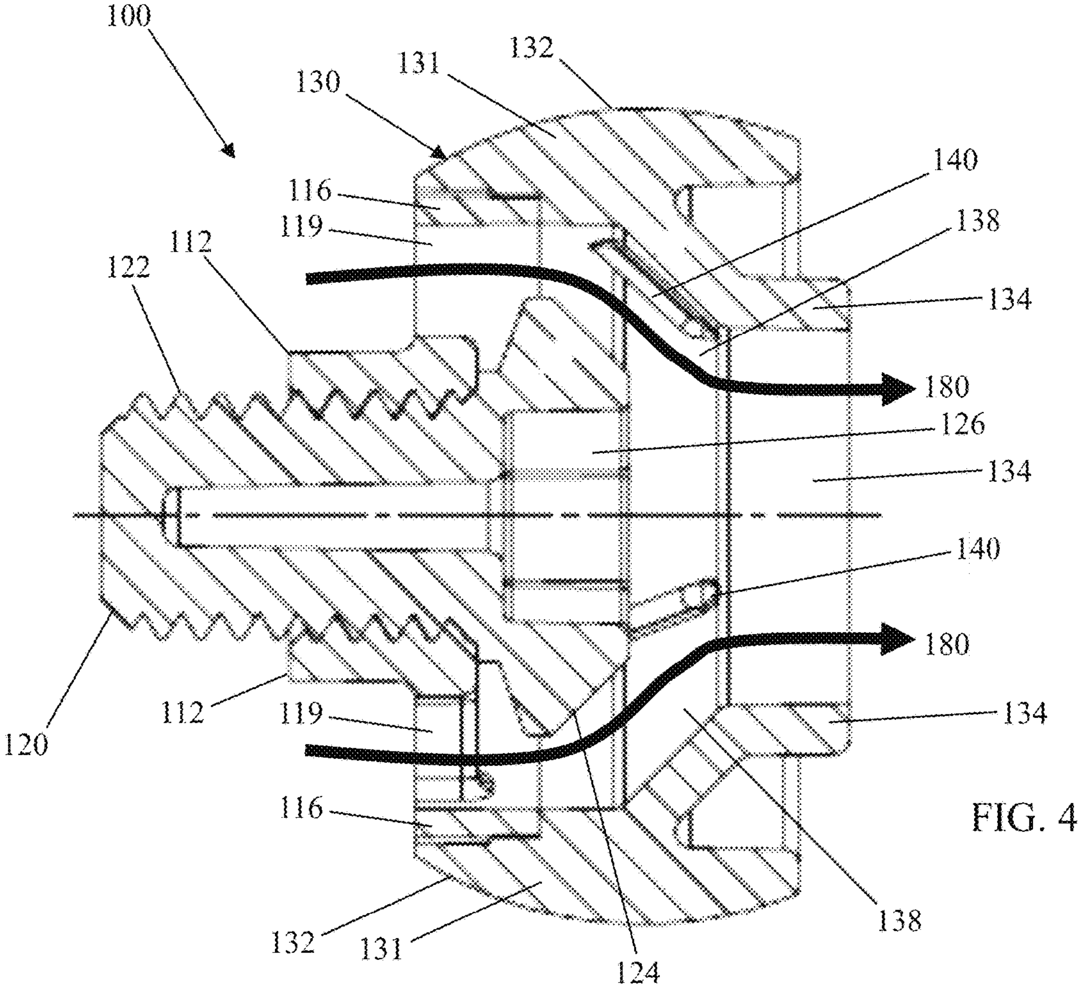
FIG. 4 is a cross section of the flow-synchronization return valve, in accordance with the first preferred embodiment; and FIG. 5A

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

As illustrated in FIGS. 1-4, the invention features a flow-synchronization return valve for adjusting and equalizing the flow of a fluid across multiple discharge points. Flow synchronization refers to the balancing of hydraulic pressure across the multiple discharge points, and two discharge points are synchronized when their flow rates are equal. The fluid may include water, air, or like substance. The preferred application for this technology is a pool, although various other applications are contemplated including ponds, reservoirs, vents, as well as heating and air conditioning (HVAC) applications.

A typical pool includes multiple discharge points to return water to the pool after the water has been filtered, for example. Some discharge points are relatively close to the pump while other discharge points are relatively far from the pump. The discharge points closest to the pump generally exhibit the highest flow rates while the more distant discharge points exhibit the lowest flow rates. The present invention enables the flow rates of all discharge points to be synchronized so that each discharge point exhibits substantially the same flow rate.

The flow-synchronization return (FSR) valve 100, in the preferred embodiment, consists of a base 110, valve element 120, valve body 130 with a valve seat 138, housing 150, and retainer 170. The amount of water that flows through the FSR valve 100 is based, in part, on the gap between the valve element 120 and valve seat 138. The gap may be opened to increase the flow of water, or the gap closed to decrease the flow of water.

The valve element 120 consists of a single bolt in the preferred embodiment. The bolt 120 includes a threaded shaft 122 and a bolt head. The bolt head, in turn, is characterized by a tapered or conical crown 124 and a tool fitting 126. The tool fitting in the preferred embodiment is a recess 126 configured to receive an Allen wrench, although the tool fitting may be configured to receive the head of a screwdriver or other tool.

The threaded shaft 122 includes "fine" threads to inhibit inadvertent and unintended movement of the valve element as a result of water flowing through the valve. Standard fine and coarse thread patterns are defined by various organizations including the American National Standards Institute, American Society of Mechanical Engineers, and SAE International, among others.

The base 110 is configured to secure the bolt 120 relative to the valve seat 138. The base 110 includes an inner ring 112 with a threaded aperture 114 configured to receive the bolt 120. When the bolt 120 is rotated, the bolt head 124 rotates either toward or away from the valve seat 138. In addition to the inner ring 112, the base 110 includes an outer ring 116 and a plurality of spokes 118 for rigidly affixing the inner ring 112 to the outer ring 116. Interposed between the spokes 118 are a plurality of apertures 119 through which water enters the FSR valve 100.

The valve body 130, in the preferred embodiment, includes a spherical member 131 characterized by a spherical surface 132. The spherical surface 132 is configured to contact a spherical surface on the inside of the housing 150, thereby enabling the valve body 130 to rotate within the housing 150. The valve body 130 further includes an outlet ring 134. Connecting the spherical member 131 to the outlet ring 134 is a conical member characterized by a conical surface 138.

The valve body 130 is configured to secure the valve seat 138 with respect to the bolt 120. To this end, the outer ring 116 of the base 110 may be affixed to the spherical member 131 by means of a friction fit, adhesive, or welded joint, for example. The body 130, in turn, may be secured inside the housing by means of the retainer 170. The retainer 170 includes raised tabs 172 (or recessed tabs) which, with the assistance of a spanner tool, are used to tighten the retainer against the valve body to secure the body 130 in the housing 150. The valve body 130 can be aimed in any direction over a wide range of angles before the retainer 170 is tightened against it, thereby enabling the user to point the outlet ring 134 is a desired direction to maximize circulation of pool water, for example.

With the base 110 and valve body 130 affixed to one another, the user can insert an Allen wrench into the outlet ring 134, contact the recess 126 in the head of the bolt 120, and rotate the bolt into or out of the base. When threaded into the base 110, the bolt 120 moves away from the conical surface 138, thereby allowing more water 180 to pass through the FSR valve 100. To restrict the amount of water flowing through the FSR valve, the user need only thread the bolt 120 out of the base 110, which moves the bolt toward the conical surface 138.

In accordance with the present invention, the conical surface 138 of the housing 150 includes at least one restriction gap stop 140 on the conical surface 138. A restriction gap stop 140 is a raised fin that protrudes from the conical surface 138 in the direction of the bolt head 124. Each restriction gap stop 140 is a narrow, elongated structure.

That is, it is narrow with respect to the circumference of the conical surface 138, but elongated with respect to the longitudinal axis of the body 130. Thus, each restriction gap stop 140 has the shape of a fin. In some other embodiments, the at least one restriction gap stops 140 are integrally mounted on, and protrude from, the conical surface of the bolt head 124 instead of the conical surface 138 of the valve body.

The restriction gap stops 140 serve two purposes: (a) first, they prevent the bolt head 124 from directly contacting the conical surface 138, and (b) second, they help guide water directly out of the outlet ring 134 into the pool with maximal pressure. With regard to the first point, a gap between bolt head 124 and the conical surface 138 prevents a user from completely closing the valve which might generate enough back pressure that it damages the pump equipment. The presence of the restriction gap stops 140 thus ensures that water can always pass through the FSR valve, thereby reducing the chance of a person causing inadvertent damage to the pump system.

With regard to the second point, the plurality of restriction gap stops 140 cooperate to funnel the water straight out the outlet ring 134. This ensures that the water discharged from the FSR valve achieves maximum projection out of the valve, which also maximizes circulation throughout the pool. Without the restriction gap stops 140, the turbulent flow through the valve would cause turbulence of the water, which would dampen the stream flowing out of the valve.

To synchronize the hydraulic pressure across multiple FSR valves, the user can start by opening each of the valves to its fully open setting. If all the valves are set to the same flow rate, the valve with the shortest run back to the pump will discharge the greatest amount of water and the valve with the longest run back to the pump will discharge the least amount of water. Next, the user selects the valve with the greatest flow rate and partially closes it until the desired flow rate is achieved. Next, the user partially closes all the remaining valves in the order from the shortest run to the longest run. Each of these remaining valves is closed until the flow rate at the particular valve matches the flow rate out of the first valve. At the end of this process, all the valves should exhibit the same flow rate. If necessary, the user can adjust all the FSR valves by turning the bolt 120 the same number of turns in the same direction, which will uniformly increase or decrease the flow rate of all the valves.

Figure 5A:
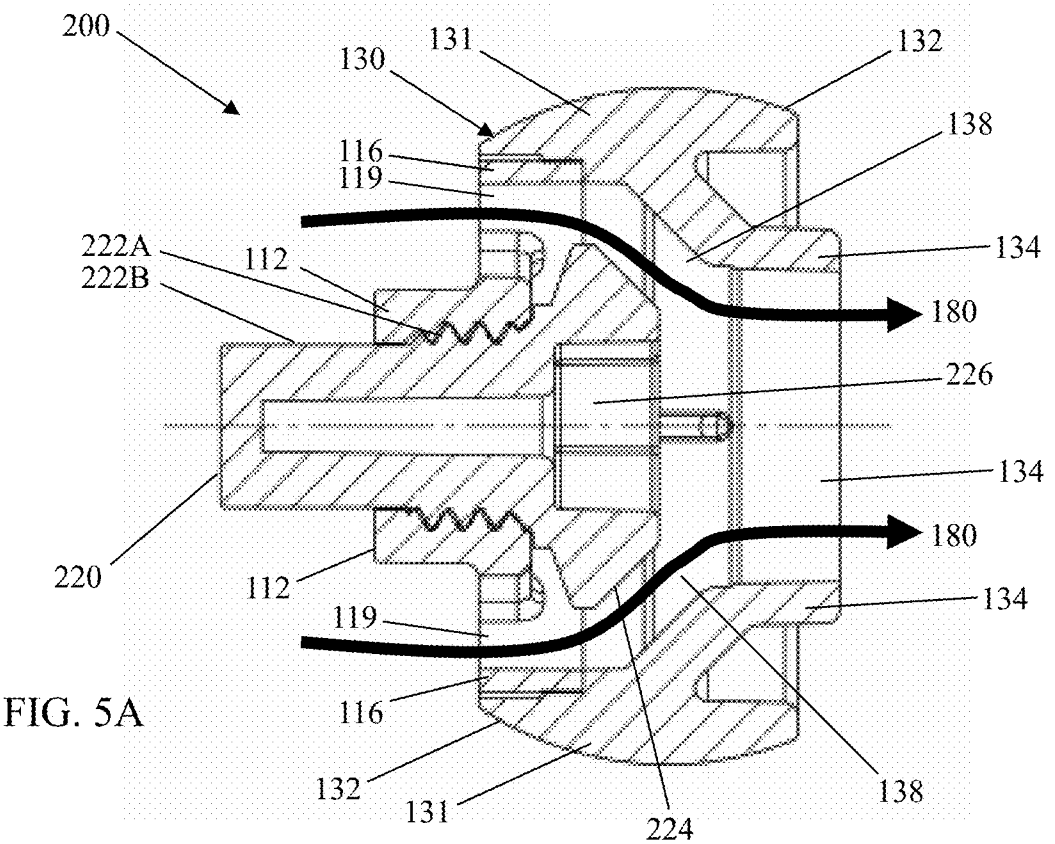
FIG. 5B is a cross section of the flow-synchronization return valve, in accordance with the second preferred embodiment.
Figure 5B:
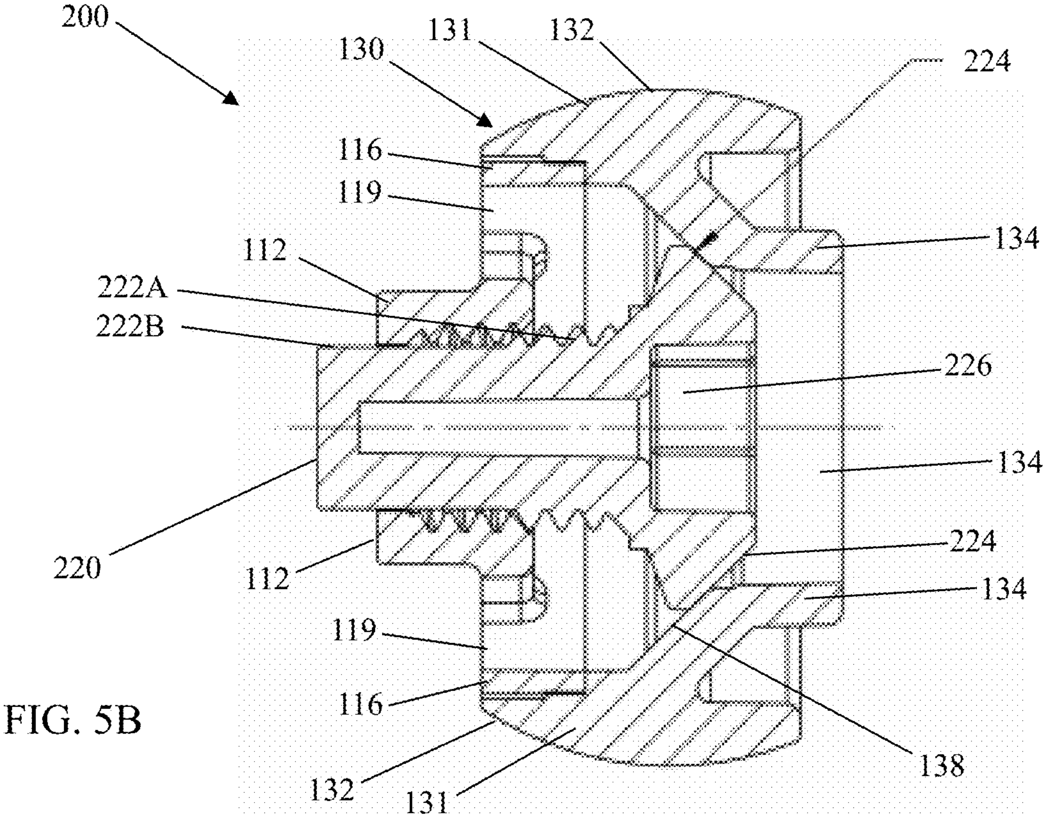

The flow-synchronization return (FSR) valve 200, in the second preferred embodiment shown in FIGS. 5A-5B, consists of a base 110, valve element 220, valve body 130 with a valve seat 138, housing 150, and retainer 170. The amount of water that flows through the FSR valve 100 is based, in part, on the gap between the valve element 220 and valve seat 138. The gap may be opened to increase the flow of water, or the gap closed to decrease the flow of water.

The valve element consists of a single bolt in the preferred embodiment. The bolt 220 includes a threaded portion 222A, non-threaded shank portion 222B, and a bolt head. The bolt head, in turn, is characterized by a tapered or conical crown 224 and a tool fitting 226. The tool fitting in the preferred embodiment is a recess configured to receive an Allen wrench, although the tool fitting may be configured to receive the head of a screwdriver or other tool.

The threaded portion 222A includes "fine" threads to inhibit inadvertent and unintended movement of the valve element as a result of water flowing through the valve. Standard fine and coarse thread patterns are defined by various organizations including the American National Standards Institute, American Society of Mechanical Engineers, and SAE International, among others.

In the second preferred embodiment, the fine threads are left-handed threads, although right-handed threads may be employed in other applications. In the second preferred embodiment, the length of the threaded portion 222A is equal to the longitudinal distance between the conical crown 224 and valve seat 138, as explained in more detail below. The longitudinal length of the shank portion 222B is approximately equal to the length of the threaded portion 222A, although this distance may vary.

The base 110 is configured to secure the bolt 220 relative to the valve seat 138. The base 110 includes an inner ring 112 with a threaded aperture 114 configured to receive the bolt 220. When the bolt 220 is rotated, the bolt head 224 rotates either toward or away from the valve seat 138. In addition to the inner ring 112, the base 110 includes an outer ring 116 and a plurality of spokes 118 for rigidly affixing the inner ring 112 to the outer ring 116. Interposed between the spokes 118 are a plurality of apertures 119 through which water enters the FSR valve 100.

The valve body 130, in the preferred embodiment, includes a spherical member 131 characterized by a spherical surface 132. The spherical surface 132 is configured to contact a spherical surface on the inside of the housing 150, thereby enabling the valve body 130 to rotate within the housing 150. The valve body 130 further includes an outlet ring 134. Connecting the spherical member 131 to the outlet ring 134 is a conical member characterized by a conical surface 138.

The valve body 130 is configured to secure the valve seat 138 with respect to the bolt 220. To this end, the outer ring 116 of the base 110 may be affixed to the spherical member 131 by means of a friction fit, adhesive, or welded joint, for example. The body 130, in turn, may be secured inside the housing by means of the retainer 170. The retainer 170 includes raised tabs 172 (or recessed tabs) which, with the assistance of a spanner tool, are used to tighten the retainer against the valve body to secure the body 130 in the housing 150. The valve body 130 can be aimed in any direction over a wide range of angles before the retainer 170 is tightened against it, thereby enabling the user to point the outlet ring 134 is a desired direction to maximize circulation of pool water, for example.

With the base 110 and valve body 130 affixed to one another, the user can insert an Allen wrench into the outlet ring 134, contact the recess 226 in the head of the bolt 120, and rotate the bolt into or out of the base. When rotated/threaded into the base 110, the bolt 220 moves away from the conical surface 138, thereby allowing more water 180 to pass through the FSR valve 100 as shown in FIG. 5A. To restrict the amount of water flowing through the FSR valve, the user need only rotate/thread the bolt 220 out of the base 110, which moves the bolt toward the conical surface 138 or against the conical surface 138 as shown in FIG. 5B.

In accordance with the second preferred embodiment, the bolt 220 includes a threaded portion 222A adjacent to the conical crown 224 as well as a smooth shank portion 222B opposite the conical crown. As the user rotates the bolt 220 out of the base 110, the conical crown 224 moves toward the conical surface 138. The threaded portion 222A is just long enough to enable the conical crown 224 to contact, or nearly contact, the conical surface 138. When the conical crown 224 comes close to, or makes contact with, the conical surface 138, the threaded portion 222A is configured to exit the threaded aperture 114 in the base 110. At this point, only the shank portion 122B resides within the threaded aperture 114. In the absence of any contact between the threaded portion 222A and threaded aperture 114, the bolt 220 can still rotate relative to the base 110, but cannot exert any force on the conical surface 138. This effectively enables the user to close the valve while preventing them from inadvertently stripping or otherwise damaging the threads of the bolt 220 and base 110 when the conical crown 224 reaches the conical surface 138.

In accordance with the present invention, the conical surface 138 of the housing 150 includes at least one restriction gap stop 140 (not shown) on the conical surface 138. A restriction gap stop 140 is a raised fin that protrudes from the conical surface 138 in the direction of the bolt head 224. Each restriction gap stop 140 is a narrow, elongated structure. That is, it is narrow with respect to the circumference of the conical surface 138, but elongated with respect to the longitudinal axis of the body 130. Thus, each restriction gap stop 140 has the shape of a fin. In some other embodiments, the at least one restriction gap stops 140 are integrally mounted on, and protrude from, the conical surface of the bolt head 224 instead of the conical surface 138 of the valve body.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, mobile phones, servers, general purpose computers, special purpose computers, application-specific integrated circuit (ASIC), and digital/analog electronic circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. A flow-synchronization return (FSR) valve comprising:
a base comprising a threaded ring;
a valve element comprising:
a) a threaded portion;
b) a shank portion with no threads; and
c) a first surface; and
a body comprising:
a) a second surface; and
b) at least one restriction gap stop protruding from the second surface;
wherein the flow rate of a fluid through the FSR valve is based, in part, on the separation distance between the first surface and the second surface; and
wherein the threaded portion is configured to engage the threaded ring when the first surface and the second surface are not in contact, and the threaded portion is configured to disengage the threaded ring when the first surface and the second surface are in contact, wherein the flow rate of the fluid through the FSR valve can be synchronized with one or more additional FSR valves.

2. The FSR valve of claim 1, wherein the at least one restriction gap stop is characterized by an elongated ridge.

3. The FSR valve of claim 2, wherein the at least one elongated ridge is configured to direct water through the valve and out of the valve in a direction perpendicular to the body.

4. The FSR valve of claim 3, wherein the second surface is characterized by a conical shape.

5. The FSR valve of claim 4, further comprising a housing and a retainer, wherein the body is configured to swivel within the housing, and the retainer is configured to lock the body in position in the housing.

6. The FSR valve of claim 3, wherein the valve element comprises a bolt.

7. The FSR valve of claim 6, wherein the bolt comprises a head, and the head comprises the first surface.

8. The FSR valve of claim 7, wherein the first surface is characterized by a conical shape.

9. The FSR valve of claim 8, wherein the bolt further comprises a bolt head configured to be turned by an Allen wrench.

10. The FSR valve of claim 8, wherein the threaded portion comprises a plurality of threads characterized by a fine pitch thread.

11. The FSR valve of claim 9, wherein the body comprises an outlet ring through which the Allen wrench can contact the bolt head.

12. The FSR valve of claim 9, wherein the bolt is characterized by a first longitudinal axis, and the body is characterized by a second longitudinal axis, and the first and second longitudinal axis coincide.

13. The FSR valve of claim 1, wherein the base is affixed to the body by means of an adhesive or weld.

14. A flow-synchronization return (FSR) valve consisting of:
a base comprising an inner threaded ring;
a valve element consisting of a bolt, wherein the bolt comprises:
a) a threaded portion;
b) a shank portion with no threads; and
c) a bolt head comprising a first surface; and a body comprising:

a) a second surface; and at least one restriction gap stop;

wherein the flow rate of a fluid through the FSR valve is based, in part, on a separation distance between the first surface and the second surface; and wherein the threaded portion is configured to engage the threaded ring when the first surface and the second surface are not in contact, and the threaded portion is configured to disengage the threaded ring when the first surface and the second surface are in contact, wherein the flow rate of the fluid through the FSR valve can be synchronized with one or more additional FSR valves.

15. The FSR valve of claim 14, wherein the at least one restriction gap stop is integral to and protrudes from the first surface.

16. The FSR valve of claim 15, wherein the first surface is characterized by a conical shape.

17. The FSR valve of claim 14, wherein the at least one restriction gap stop is integral to and protrudes from the second surface.

18. The FSR valve of claim 17, wherein the second surface is characterized by a conical shape.

19. The FSR valve of claim 15, wherein the base further comprises:

an outer ring configured to mount to the body; and a plurality of spokes connecting the inner threaded ring to the outer ring;

wherein a plurality of apertures are formed between the spokes, and wherein the apertures are configured to pass water or other fluid to body.

20. A flow-synchronization return (FSR) valve comprising:

a base comprising a threaded ring;

a valve element comprising:

a) a threaded shaft configured to engage the threaded ring; and b) a first surface;

a body comprising:

a) a second surface characterized by a conical shape; and b) at least one restriction gap stop protruding from the second surface; and a housing, wherein the body is configured to swivel within the housing;

wherein the flow rate of a fluid through the FSR valve is based, in part, on the separation distance between the first surface and the second surface; and wherein the at least one restriction gap stop is configured to prevent the first surface from contacting the second surface and to direct water through the valve and out of the valve in a direction perpendicular to the body, wherein the flow rate of the fluid through the FSR valve can be synchronized with one or more additional FSR valves.

21. The FSR valve of claim 20, wherein the at least one restriction gap stop is characterized by an elongated ridge.

22. The FSR valve of claim 20, further comprising a housing and a retainer, wherein the body is configured to swivel within the housing, and the retainer is configured to lock the body in position in the housing.

23. The FSR valve of claim 20, wherein the valve element comprises a bolt.

24. The FSR valve of claim 23, wherein the bolt comprises a head, and the head comprises the first surface.

25. The FSR valve of claim 24, wherein the first surface is characterized by a conical shape.

26. The FSR valve of claim 24, wherein the bolt is characterized by a first longitudinal axis, and the body is characterized by a second longitudinal axis, and the first and second longitudinal axis coincide.

27. A flow-synchronization return (FSR) valve consisting of:

a base comprising:

a) an inner threaded ring;

b) an outer ring; and c) a plurality of spokes connecting the inner threaded ring to the outer ring;

a valve element consisting of a bolt, wherein the bolt comprises:

a) a threaded shaft configured to engage the threaded ring; and b) a bolt head comprising a first surface; and a body comprising:

a) a second surface; and at least one restriction gap stop;

wherein the flow rate of a fluid through the FSR valve is based, in part, on a separation distance between the first surface and the second surface; and wherein the at least one restriction gap stop is configured to prevent the first surface from contacting the second surface;

wherein the at least one restriction gap stop is integral to, and protrudes from, the first surface;

wherein the flow rate of the fluid through the FSR valve can be synchronized with one or more additional FSR valves.

28. The FSR valve of claim 27, wherein the first surface is characterized by a conical shape.

29. The FSR valve of claim 28, wherein the second surface is characterized by a conical shape.

30. The FSR valve of claim 27, wherein the base further comprises:

an outer ring configured to mount to the body; and a plurality of spokes connecting the inner threaded ring to the outer ring;

wherein a plurality of apertures are formed between the spokes, and wherein the apertures are configured to pass water or other fluid to body.

* * * * *